(12) United States Patent
Siegel et al.

(10) Patent No.: US 7,466,875 B1
(45) Date of Patent: Dec. 16, 2008

(54) METHOD AND SYSTEM FOR DETERMINING THE LEGIBILITY OF TEXT IN AN IMAGE

(75) Inventors: Hilliard Siegel, Seattle, WA (US); David Chick, Seattle, WA (US)

(73) Assignee: Amazon Technologies, Inc., Incline Village, NV (US)

( * ) Notice: Subject to any disclaimer, the term of this patent is extended or adjusted under 35 U.S.C. 154(b) by 964 days.

(21) Appl. No.: 10/790,256

(22) Filed: Mar. 1, 2004

(51) Int. Cl.
*G06K 9/36* (2006.01)

(52) U.S. Cl. .................. 382/286; 382/299; 382/309; 358/1.2; 358/537; 358/462

(58) Field of Classification Search ............. 382/176, 382/177, 187, 209, 278, 286, 309; 358/403, 358/449, 462, 1.2, 537
See application file for complete search history.

(56) References Cited

U.S. PATENT DOCUMENTS

| | | | | |
|---|---|---|---|---|
| 4,850,026 A | * | 7/1989 | Jeng et al. | 382/185 |
| 4,944,022 A | * | 7/1990 | Yasujima et al. | 382/155 |
| 4,994,987 A | * | 2/1991 | Baldwin | 434/305 |
| 5,014,327 A | * | 5/1991 | Potter et al. | 382/220 |
| 5,167,016 A | * | 11/1992 | Bagley et al. | 715/210 |
| 5,465,309 A | * | 11/1995 | Johnson | 382/229 |
| 5,956,468 A | * | 9/1999 | Ancin | 358/1.9 |
| 5,960,448 A | * | 9/1999 | Reichek et al. | 715/526 |
| 6,038,342 A | * | 3/2000 | Bernzott et al. | 382/173 |
| 6,661,919 B2 | * | 12/2003 | Nicholson et al. | 382/173 |
| 6,980,332 B2 | * | 12/2005 | Simske | 358/445 |
| 2004/0199875 A1 | | 10/2004 | Samson | |

\* cited by examiner

*Primary Examiner*—Yosef Kassa
(74) *Attorney, Agent, or Firm*—Christensen O'Connor Johnson Kindness PLLC

(57) ABSTRACT

Legibility of text in an image of a page is determined by comparing a measure of the text in the page image with a measure of the page image itself. In one aspect, a measure of the text in the page image may be the height of a line of text, while the measure derived from the page image may be the height of the page image. A text-to-page height ratio is determined and compared to one or more thresholds for determining legibility. In another aspect of the invention, a measure of the text in a page image is obtained by measuring the word density in the page image, while the measure derived from the page image comprises compressing the page image and determining the size of the compressed image file. Legibility is then determined by comparing the measure of word density with the compressed image file size.

41 Claims, 12 Drawing Sheets

32

The Declaration of Independence

(Transcribed)

IN CONGRESS, July 4, 1776.

The unanimous Declaration of the thirteen united States of America,

When in the Course of human events, it becomes necessary for one people to dissolve the political bands which have connected them with another, and to assume among the powers of the earth, the separate and equal station to which the Laws of Nature and of Nature's God entitle them, a decent respect to the opinions of mankind requires that they should declare the causes which impel them to the separation.

We hold these truths to be self-evident, that all men are created equal, that they are endowed by their Creator with certain unalienable Rights, that among these are Life, Liberty and the pursuit of Happiness.--That to secure these rights, Governments are instituted among Men, deriving their just powers from the consent of the governed, --That whenever any Form of Government becomes destructive of these ends, it is the Right of the People to alter or to abolish it, and to institute new Government, laying its foundation on such principles and organizing its powers in such form, as to them shall seem most likely to effect their Safety and Happiness. Prudence, indeed, will dictate that Governments long established should not be changed for light and transient causes; and accordingly all experience hath shewn, that mankind are more disposed to suffer, while evils are sufferable, than to right themselves by Thomas Jefferson: Author of the Declaration of Independence and third president of the United States

$y_1$ — The Declaration of Independence $y_2$ — (Transcribed)

$y_3$ — IN CONGRESS, July 4, 1776.

$y_4$ — The unanimous Declaration of the thirteen united States of America, $y_5$ — When in the Course of human events, it becomes necessary for one people to dissolve the
$y_6$ — political bands which have connected them with another, and to assume among the powers
$y_7$ — of the earth, the separate and equal station to which the Laws of Nature and of Nature's God
$y_8$ — entitle them, a decent respect to the opinions of mankind requires that they should declare
$y_9$ — the causes which impel them to the separation.

$y_{10}$ — We hold these truths to be self-evident, that all men are created equal, that they are endowed
$y_{11}$ — by their Creator with certain unalienable Rights, that among these are Life, Liberty and the
$y_{12}$ — pursuit of Happiness.--That to secure these rights, Governments are instituted among Men,
$y_{13}$ — deriving their just powers from the consent of the governed, --That whenever any Form of
$y_{14}$ — Government becomes destructive of these ends, it is the Right of the People to alter or to
$y_{15}$ — abolish it, and to institute new Government, laying its foundation on such principles and
$y_{16}$ — organizing its powers in such form, as to them shall seem most likely to effect their Safety
$y_{17}$ — and Happiness. Prudence, indeed, will dictate that Governments long established should not
$y_{18}$ — be changed for light and transient causes; and accordingly all experience hath shewn, that
$y_{19}$ — mankind are more disposed to suffer, while evils are sufferable, than to right themselves by $y_{20}$ — Thomas Jefferson: Author of the Declaration of Independence and third president of the United States — $y_p$

FIG. 5.

METHOD AND SYSTEM FOR DETERMINING THE LEGIBILITY OF TEXT IN AN IMAGE

FIELD OF THE INVENTION

The present invention is directed to processing of digital images, and more particularly to processing and displaying images of content having text therein.

BACKGROUND OF THE INVENTION

As the use of computers and computer-based networks continues to expand, content providers are preparing and distributing more and more content in electronic form. This content includes traditional media such as books, magazines, newspapers, newsletters, manuals, guides, references, articles, reports, documents, etc., that exist in print, as well as electronic media in which the aforesaid content exits in digital form. The Internet, in particular, has facilitated the wider publication of digital content through downloading and display of images of content. As data transmission speeds increase, more and more images of pages of content are becoming available online. Page images allow the reader to see the page as it would appear in print. Furthermore, graphics, such as charts, drawings, pictures, etc., and the layout of such graphics in a page, are not lost when the page of content is provided as a digital image.

Despite the great appeal of providing digital images of content, the cost of storing images of content remains a concern for many content providers. To minimize storage costs, content providers desire to minimize the size of files used to store the images. Digital images may be represented at a variety of resolutions, typically denoted by the number of pixels in the image in both the horizontal and vertical directions. Typically, though not always, higher resolution images have a larger file size and require a greater amount of memory for storage. The cost of storing images of content can greatly multiply when one considers the number of images it takes to capture and store large volumes of media, such as books, magazines, etc.

While reducing the size and resolution of images often reduces the requirements for storing the images, low resolution images eventually reach a point where, if too small, the image is difficult for readers to perceive when displayed. This problem is further exacerbated when the images represent pages of content containing text that readers desire to read. If the text in an image of content is not legible, the value of the image significantly decreases. Content providers wishing to provide page images with text that can be read must ensure that the images have sufficient resolution to provide legible text when displayed.

The legibility of text in a digital image is largely a matter of human perception. Content providers that have a significant amount of digital images of content face the difficulty of determining whether a given image of content has sufficient resolution to be perceived as legible by most readers. One solution is to employ human readers to visually inspect images of content to determine whether the images are legible. For large repositories of content, however, a process of human review can become inordinately time-consuming and expensive. What is needed is a method and system that can be implemented in a computer to process images of content and determine whether text in an image is likely to be legible to readers. The present invention addresses this need and other shortcomings in the prior art.

SUMMARY OF THE INVENTION

Embodiments of the invention discussed herein are directed to a computer-implemented method and system for determining the legibility of text in an image of a page. In accordance with a method embodiment of the invention, the method includes first obtaining an image of a page of content having text therein. Text recognition is then performed on the text in the page image from which a measure of the text is produced. The measure of the text is compared to a measure derived from the page image itself, and based on the comparison of the text and page image measures, the legibility of the text in the page image is determined.

In one aspect, the text recognition may comprise identifying a spatial dimension of the text in the page image. In this aspect, the measure of the text in the page image is a measure of the text in the identified spatial dimension, e.g., the height of a line of text, while the measure derived from the page image itself may be a measure of the height of the page image in the same spatial dimension. The text height is divided by the page image height to produce a text-to-page height ratio that is compared to a threshold. If the text-to-page height ratio does not satisfy the threshold, the text is determined not legible. Conversely, if the text-to-page height ratio does satisfy the threshold, the text in the page image is determined legible.

Text recognition may be performed on text in a single line of the page image. Alternatively, the text recognition may be performed on multiple lines of text in the page image. Each of the multiple lines of text may produce a text-to-page height ratio that is compared to a threshold. The legibility of the text in the page image may then be determined based on a percentage of the text-to-page height ratios that satisfy the threshold.

Multiple thresholds for determining legibility may be used in the invention. For example, if a text-to-page height ratio satisfies both a first and a second threshold, the text may be determined legible. If the text-to-page height ratio satisfies the first threshold but not the second threshold, the text may be determined possibly legible. Otherwise, if the text-to-page height ratio does not satisfy the first threshold, the text is determined not legible. Page images having text determined to be legible may be stored in a memory for display. If a page image is determined to be not legible, the page image may be replaced with a higher resolution image of the page.

In another aspect of the invention, the text recognition performed on the text in the page image may comprise identifying and counting words in the page image. A measure of the text in the page image is obtained by calculating a measure of the density of the words in the page image based on the number of words and the spatial size of the page image. Furthermore, in this aspect of the invention, a measure derived from the page image may comprise compressing the page image to form a compressed image file and determining the file size of the compressed image file. The legibility of the text in the page image is then determined by comparing the measure of word density in the page image with the file size of the compressed image file. Page images, for example, having a large compressed file size and a high word density may be determined legible, while page images having a high word density with a small compressed file size may be determined not legible. Page images having a low word density and a small compressed file size may be determined possibly legible. Multiple legibility tests may be applied to images determined to be possibly legible to determine whether, in fact, the text in the page images are legible.

Further embodiments of the invention described herein provide a computer-implemented method for displaying a page image based on a determined legibility of text in the page image using methods substantially as described above. Embodiments of the invention also describe a multistage method for automated determination of legibility of text in an image of a page using multiple tests of legibility.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3 depicts the entire image of the page of content displayed in the browser program of FIG. 2;

FIG. 5 depicts the page image shown in FIG. 3 in which a legibility test of the type shown in FIG. 4 is applied to the page image;

DETAILED DESCRIPTION OF THE PREFERRED EMBODIMENT

The present invention is directed to a method and system that determines the legibility of text in an image of a page of content. The legibility of text in a page image is determined by comparing a measure of the text in the page image with a measure derived from the page image itself. In some embodiments, a test of legibility is performed by identifying a spatial dimension of a page image and comparing measures of text height and page image height in the identified spatial dimension. In other embodiments, a test of legibility is performed by calculating a measure of word density in the page image and comparing the word density to a file size of the page image that has been compressed using an image compression algorithm. The following detailed description provides several exemplary implementations of the invention. Although specific flow diagrams and system configurations are illustrated, it should be understood that the examples provided are not exhaustive and do not limit the invention to the precise forms disclosed. Persons having ordinary skill in the field of computers and digital imaging will recognize process steps described herein that may be interchangeable with other steps, or combinations of steps, and still achieve the benefits and advantages of the present invention.

Figure 1:
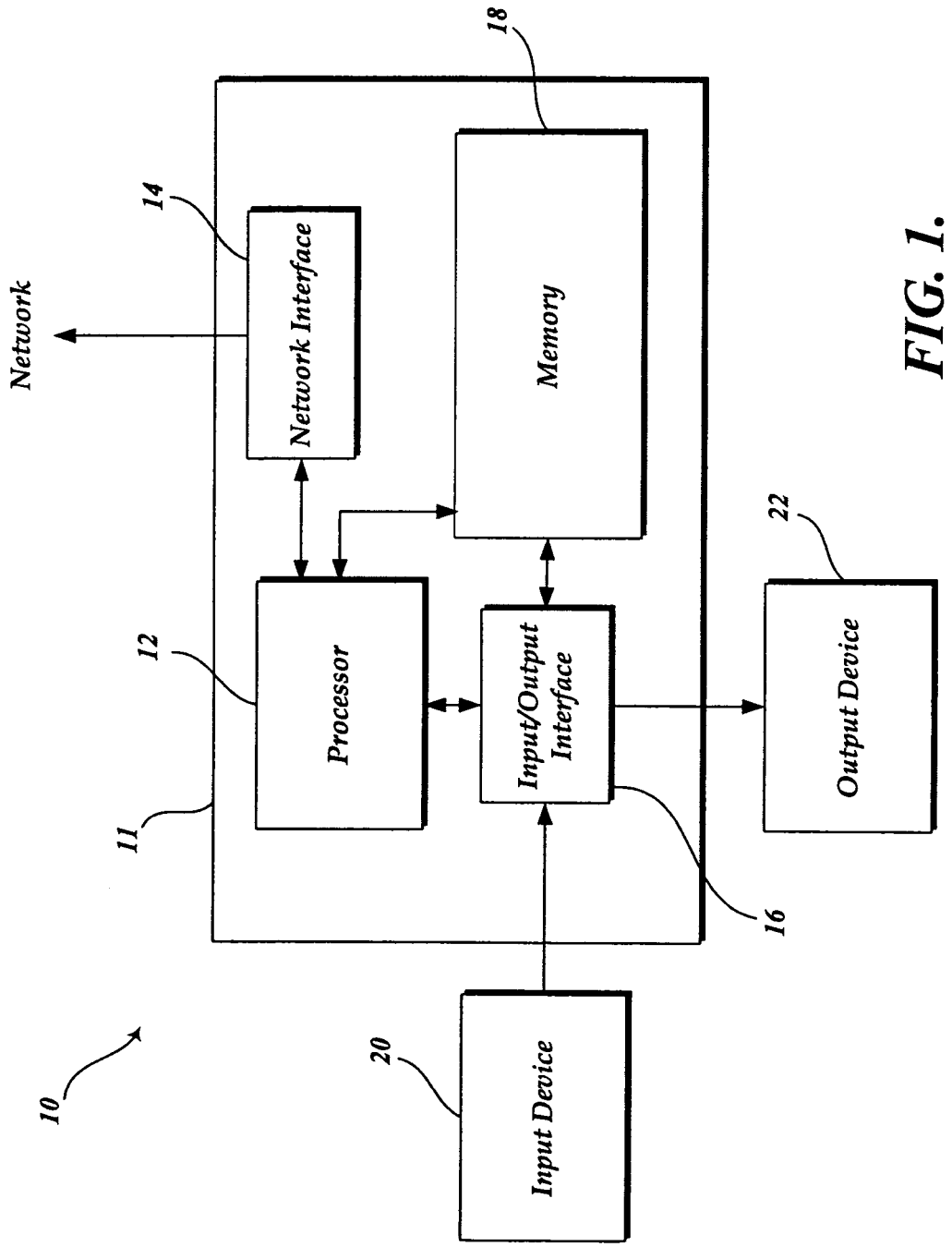
FIG. 1 is a functional block diagram of an exemplary computing system that may be used to implement an embodiment of the present invention.

To provide a context for describing embodiments of the present invention, FIG. 1 illustrates a functional block diagram of a computing system 10 that may be used to implement the present invention. The computing system 10 includes a computing device 11 having a processor 12 in communication with a variety of computing elements, including a network interface 14, an input/output interface 16, and a memory 18. The network interface 14 enables the computing device 11 to communicate data, control signals, data requests, and other information via a computer network (LAN, WAN, Internet, etc.). For instance, the computing device 11 may receive a file containing a digital image of content from a computer network via the network interface 14.

The input/output interface 16 enables the computing device 11 to communicate with various local input and output devices. An input device 20 in communication with the input/output interface 16 may include computing elements that provide input signals to the computing device 11, such as a digital camera, a scanner, a keyboard, mouse, external memory, disk drive, etc. Input devices comprising cameras and scanners, for example, may be used to provide digital images of content to the computing device 11 for processing and legibility analysis in accordance with the present invention.

An output device 22 in communication with the input/output interface 16 may include typical output devices, such as a computer display (e.g., CRT or LCD screen), a television, printer, facsimile machine, copy machine, etc. As to the present invention, the output device 22 may be used to display images with text that the computing device 11 determines to be legible.

The processor 12 is configured to operate in accordance with computer program instructions stored in a memory, such as the memory 18. Program instructions may also be embodied in a hardware format, such as a programmed digital signal processor. Furthermore, the memory 18 may be configured to store digital images of content for processing transmission, and display in accordance with the present invention. Those having ordinary skill in the art of computers will recognize a wide selection of commercially-available components that can be used to construct a system such as the computing system 10 illustrated in FIG. 1.

Figure 2:
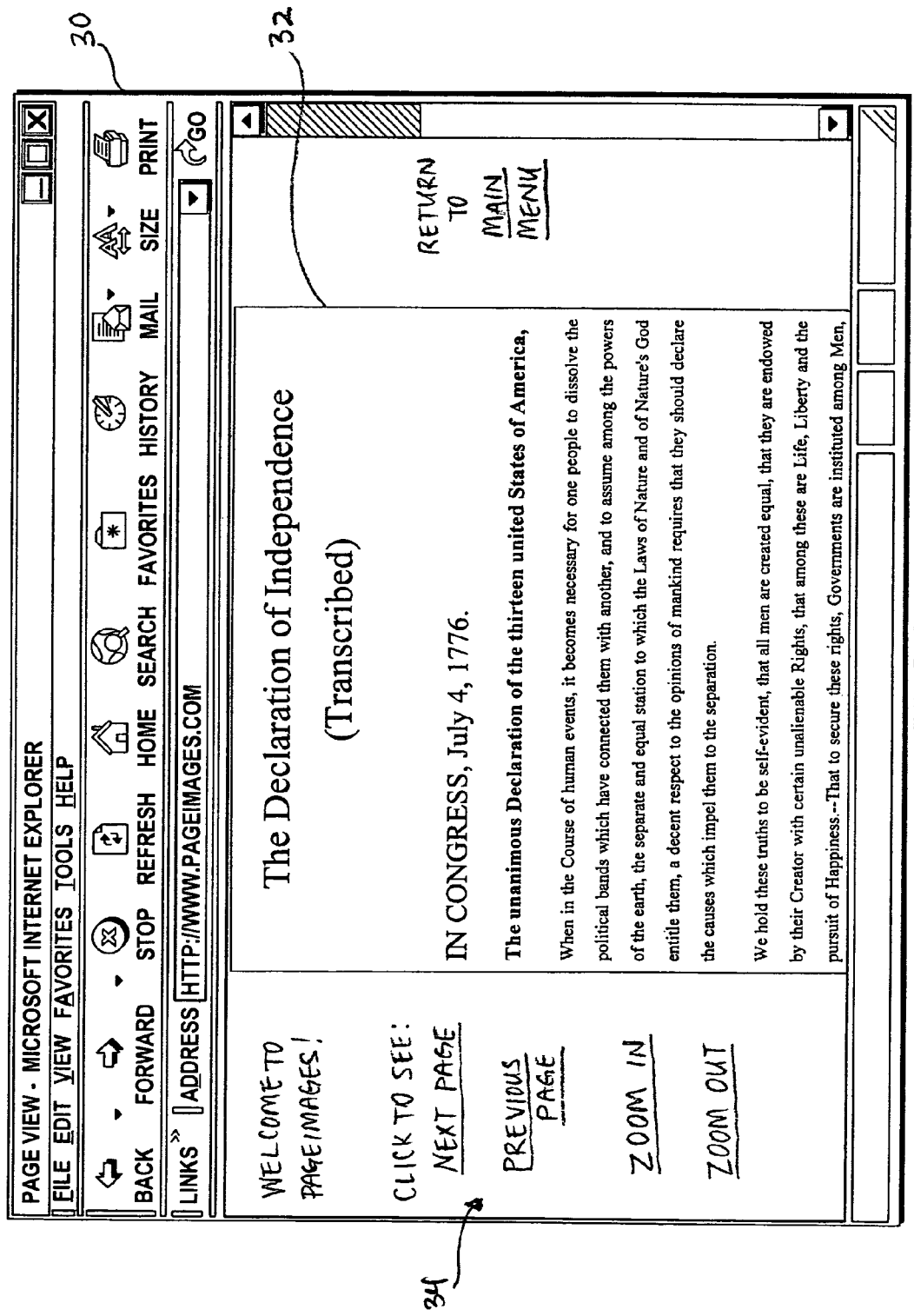
FIG. 2 is a pictorial view of a browser program depicting a Web page in which a digital image of a page of content is displayed.

FIG. 2 illustrates a Web environment in which the present invention may be used. Content providers having digital images of content may distribute those images over the Internet for display by remote computing devices. For example, FIG. 2 illustrates the display of a computing device that is operating a browser program 30. At the top of the browser display are various controls for operating the browser. Depicted underneath the controls is a Web page in which a digital image of content 32 is displayed. The Web page may include additional controls 34 for browsing through the pages of content 32 being displayed. Although the controls 34, as shown, indicate that a reader of the page image 32 may "zoom in" or "zoom out", content providers may prefer, at least initially, to display the page image 32 at its native (i.e., full) resolution.

For purposes of reference, FIG. 3 depicts the entire page image 32 that is shown in the browser display 30 of FIG. 2. Lower resolution images will produce a smaller display image and higher resolution images will produce a larger display image. Scrolling through the Web page in the browser display allows the reader to access the bottom portion of the page image not shown in FIG. 2.

Embodiments of the invention described herein determine whether text in page images, such as the page image 32 shown in FIG. 3, is likely to be legible to readers when displayed in a computer display, such as shown in FIG. 2. Generally speaking, if text in a page image is determined to be not legible, content providers may seek to obtain a higher resolution image of the page to ensure the legibility of the page image when displayed.

Figure 4:
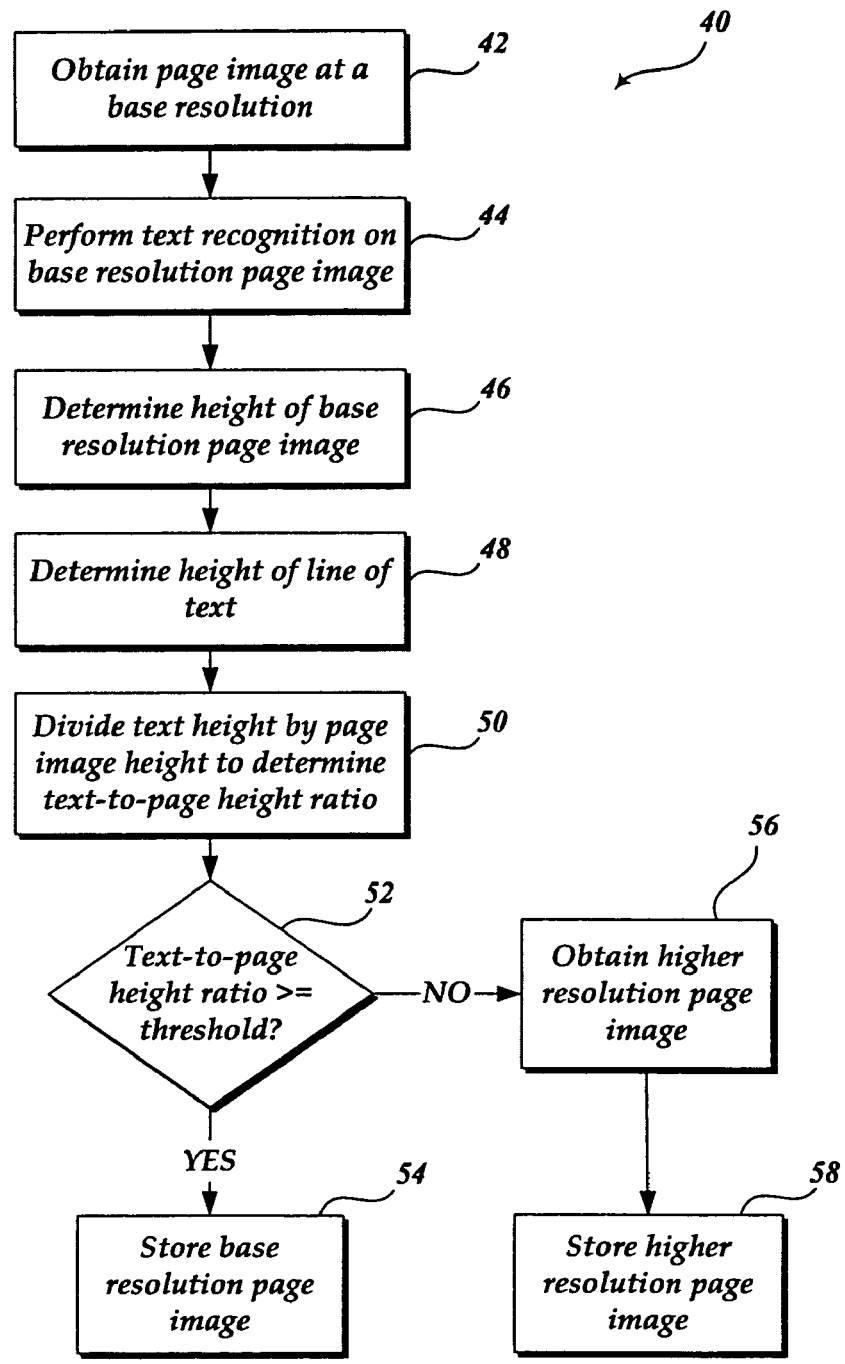
FIG. 4 is a flow diagram of one exemplary method for determining the legibility of text in a page image according to one embodiment of the present invention.

FIG. 4 depicts an exemplary method 40 for determining the legibility of text in a page image according to one embodiment of the present invention. The method 40 involves assessing the legibility of text in a page image based on a comparison of text height and page height. The method 40 begins at block 42 by obtaining a page image at a base resolution. One possible base resolution may be 640×480 pixels. Other base resolutions may be larger or smaller, as desired. A base resolution page image may be obtained by scanning a page of content at the base resolution. Alternatively, the base resolution page image may be derived from an original high resolution image of a page that was previously obtained.

At block 44, the method 40 performs text recognition on text in the base resolution page image. Those of ordinary skill in the art will recognize a wide variety of algorithms and techniques capable of recognizing text in an image. For purposes of the present invention, it is not necessary that the text recognition actually recognize the individual components of words or symbols or interpret the meaning of those words or symbols, as achieved by many optical character recognition (OCR) routines. An OCR-like process may be used in which limited information such as the location and size of text in the page image is ascertained. For example, the boxes shown around text in FIG. 10 pictorially illustrate an OCR-like process that has determined the location and size of text in a page image.

It should also be understood that, in the context of the present invention, the term "text" includes all forms of letters, characters, symbols, numbers, formulas, etc., that may be used to represent information in a page image. The term "page" broadly refers to any space of two dimensions or greater in which text may reside. For simplicity, the text recognition performed in the method 40 need only be performed on part of a single line of text in the page image. As will be discussed below in reference to FIGS. 6A and 6B, embodiments of the invention may alternatively perform text recognition on multiple lines of text in a page image.

At block 46, the method 40 determines the height of the base resolution page image. The height of the page image may be determined using any suitable units of measure, such as inches, centimeters, numbers of pixels, etc., that extend over a spatial dimension. At block 48, the method 40 determines the height of the text that was recognized by the text recognition of block 44. The height of the text is determined in the same spatial dimension as the determined height of the page image, preferably using the same units of measure.

The method 40 divides the text height by the page image height to determine a text-to-page height ratio, as indicated at block 50. The text-to-page height ratio, in this embodiment of the invention, is used as a measure of the legibility of the text in the page image. Generally speaking, the greater the text-to-page height ratio, the more likely the text in the page image is legible to readers.

In decision block 52, the text-to-page height ratio of the base resolution page image is compared to a threshold ratio. If the text-to-page height ratio is greater than or equal to the threshold, the text in the base resolution page image is determined to be legible and the page image is stored, as indicated at block 54, for display to readers. Minimum text-to-page height ratios may be determined as needed for different displays, for example, using empirical studies of the legibility of page images at varying resolutions. A sampling of readers may be polled to determine text-to-page height ratios corresponding to text that the readers find to be legible. Recognized text meeting a threshold minimum text-to-page height ratio is considered to be legible.

If, at decision block 52, the text-to-page height ratio does not exceed the threshold ratio, the text in the base resolution page image is determined to be not legible. In view of such result, a content provider may wish to obtain another image of the page at a resolution higher than the base resolution, as indicated at block 56. The higher resolution page image may be assumed to be legible and stored, as shown at block 58, for display to readers. Alternatively, a legibility test, such as the one provided by the method blocks 44, 46, 48, 50, and 52, may be repeated for the page image at successively higher resolutions until an image of the page is obtained at a resolution that displays legible text to readers. In instances where higher resolution page images are required, the higher resolution images may be obtained by rescanning the page of content at a higher resolution. In instances where the base resolution page image was obtained from an original high resolution page image, the method 40 may use the original high resolution page image to again derive an image of the page, but at a resolution higher than the earlier base resolution.

The method 40 thus determines the legibility of text in a page image by comparing a measure of the text in the page image (here, a measure of text height) with a measure derived from the page image itself (here, a measure of the height of the page image). FIG. 5 depicts the page image shown in FIG. 3 in which a legibility test is conducted in accordance with the type of method as described in FIG. 4. The height of the page image 32 is referenced by $Y_p$. The height of text in the page image is illustrated by references $Y_1, Y_2, \ldots Y_{20}$, for each of the lines of text shown in the page image 32. As noted earlier, the method 40 shown in FIG. 3 involves recognition and measurement of text in at least one line of the page image 32. The line of text that is recognized and measured by the method 40 may be chosen at random in the page image, or it may be a line at a selected position in the page image. It should be noted that the text recognition performed in the method 40 does not need to determine the length of any given line of text; it need only determine the height of text. Other embodiments of the invention may compare the width of a character of text with the width of the page image. Again, these are both measurements of text and of the page in a given spatial dimension.

Although determining the legibility of text can be performed on only a single line of text, content providers may desire to analyze multiple lines of text for legibility to avoid circumstances in which the measurement of text in a given line may skew the overall legibility determination. For example, in the page image 32 shown in FIG. 5, different lines of text may result in different measurements of text height. The text height $Y_1$ and $Y_2$, for example, is greater than the text height $Y_3$, which is greater than the text height $Y_4$, which is greater than the text height $Y_5$-$Y_{19}$. The text height of the last line $Y_{20}$ is the smallest, as it represents the height of a footnote in the page image 32. If only a single line is analyzed and it happens to be the last line with height $Y_{20}$, the entire page image 32 may be deemed not legible, even though the larger size of text of lines 1-19 may, in fact, be legible. Recognizing and evaluating text in multiple lines in an image helps overcome the foregoing risk in single line implementations of the invention.

In some circumstances, depending on the importance of legibility, a content provider may wish to identify the smallest text in a page and ensure that the page image is provided at a high enough resolution that the smallest text meets the legibility threshold. In other circumstances, the content provider may determine that the text in a page image is sufficiently legible if a certain percentage of lines of text in the page image are determined legible, as will be seen next in FIGS. 6A and 6B.

Figure 6A:
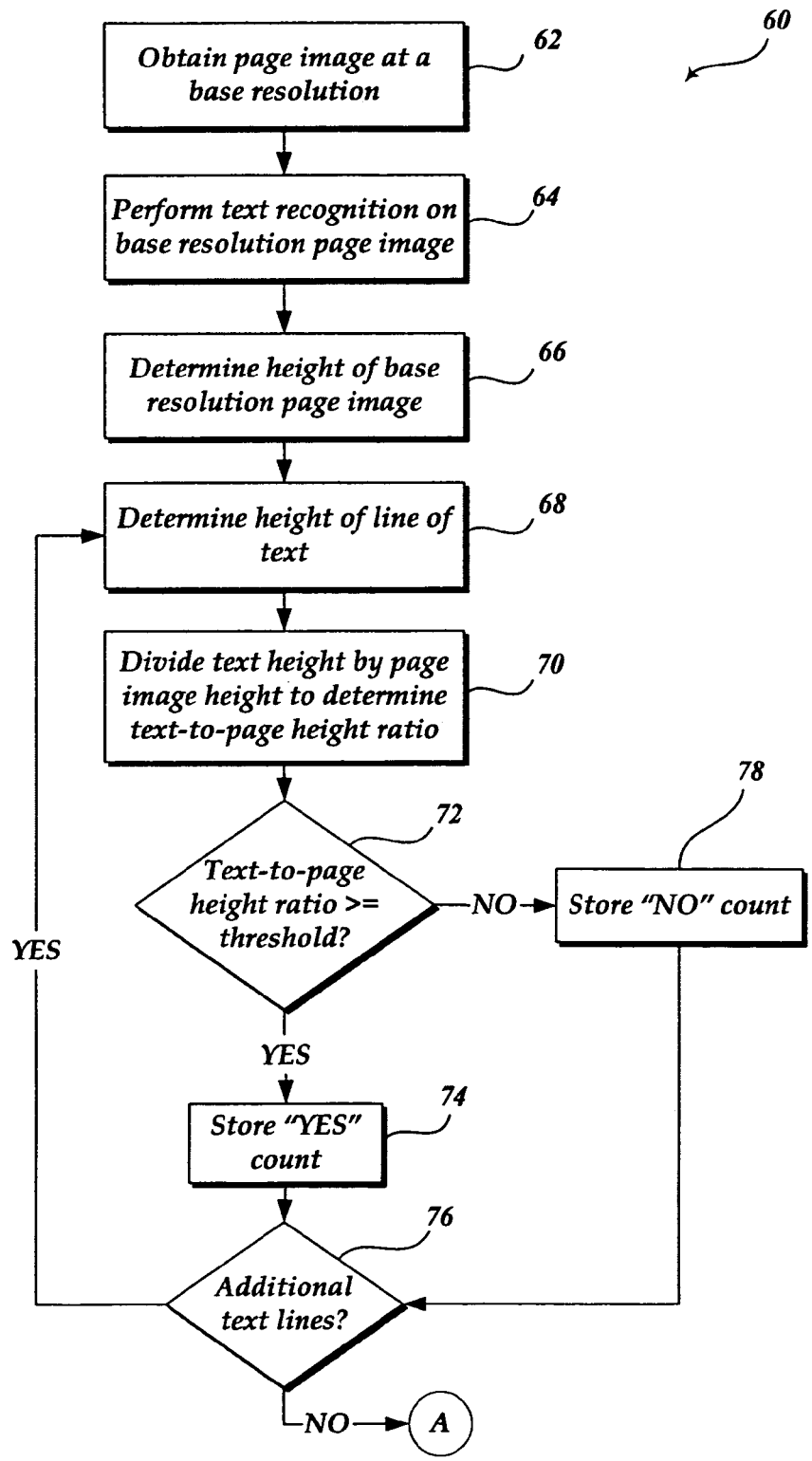
FIGS. 6A and 6B are flow diagrams of another exemplary method for determining the legibility of text in a page image.
Figure 6B:
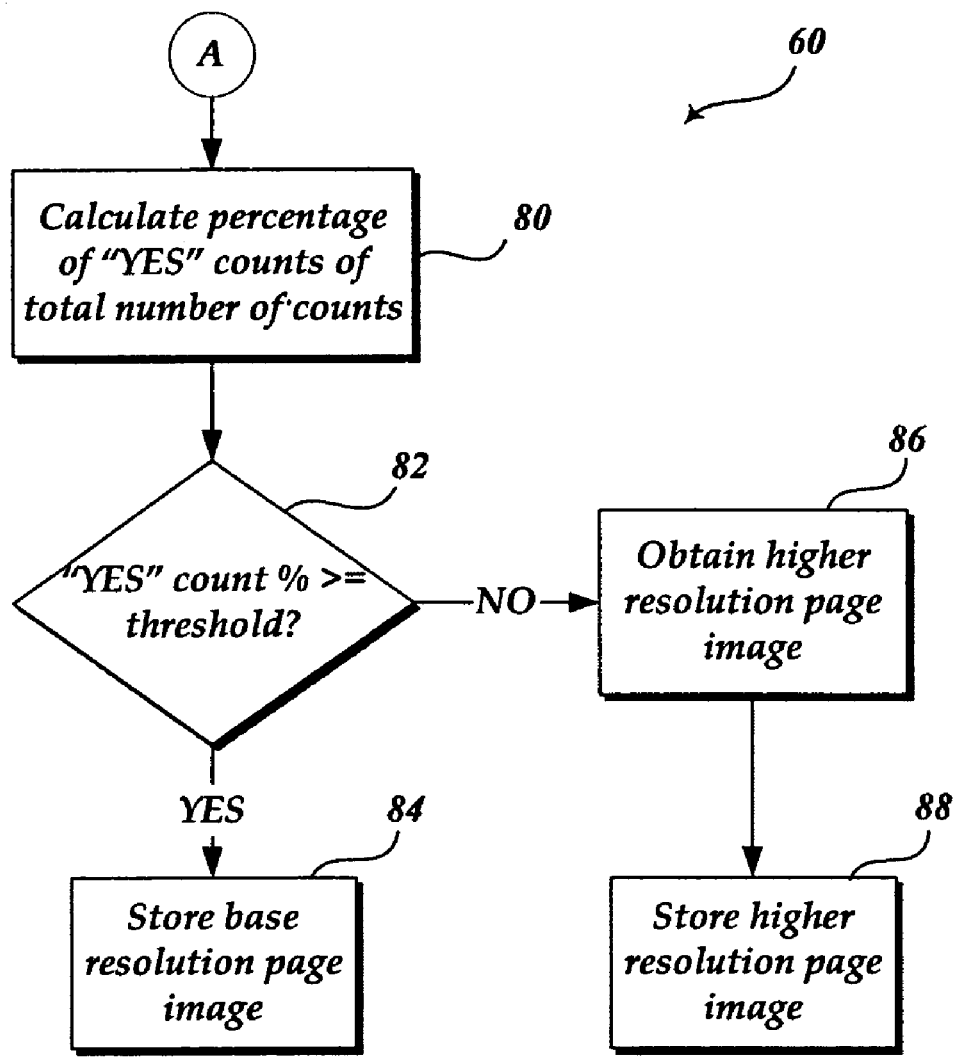

FIGS. 6A and 6B depict another example of a method 60 for determining the legibility of text in a page image. In the method 60, multiple lines of text in the page image are evaluated for legibility. The method 60 begins at block 62 by obtaining a page image at a base resolution. At block 64, text recognition is performed on the base resolution page image and at block 66, the height of the base resolution page image is determined. The process of obtaining a page image, performing text recognition on the page image, and determining the height of the page image may be performed in a manner similar to the processes described in FIG. 4.

At block 68, the height of a line of text is determined, and at block 70, the text height is divided by the page image height to determine a text-to-page height ratio. Again, these processes may be performed in a manner similar to those processes described in FIG. 4.

At decision block 72, the text-to-page height ratio is compared to a threshold for legibility, and if the ratio is greater than or equal to the threshold, the method 60 stores a "YES" count in memory, as indicated at block 74. The "YES" count signifies text whose text-to-page height ratio equaled or exceeded the threshold.

At decision block 76, the method 60 determines whether additional lines of text that were recognized in the page image remain for evaluation. The method 60 may be configured to evaluate some or all of the lines of text in a page image, as desired. If additional text lines are determined to remain for evaluation, the method 60 returns from decision block 76 to block 68, where it determines the height of text for a new line in the page image. The process of determining a text-to-page height ratio for each new line of text, and its comparison to a threshold ratio, is repeated until no further text lines remain for evaluation.

If at decision block 72, the method 60 determines that the text-to-page height ratio for a given line of text is not greater than the threshold, the method 60 may store a "NO" count in memory, signifying that the line of text is determined not legible.

When there remain no additional text lines for legibility determination, the method 60 proceeds to block 80, as shown in FIG. 6B, where the method calculates the percentage of "YES" counts in the total number of counts stored in memory. At decision block 82, the percentage of "YES" counts is compared to a threshold percentage. If the percentage of "YES" counts for the base resolution page image is greater or equal to than the threshold percentage, the text in the page image is determined to be legible. A threshold percentage set at 80, for example, indicates that text in a page image will be determined legible if eighty percent of the text lines evaluated have a text-to-page height ratio equaling or exceeding the threshold ratio. If the base resolution page image is determined to be legible, the page image may be stored, as indicated at block 84, for display to readers.

If, at decision block 82, the percentage of "YES" counts is not greater than the threshold percentage, the text in the base resolution page image is determined to be not legible. At that point, the method 60 may proceed to block 86 where a new image of the page is obtained at a resolution that is higher than the base resolution. As with the method 40 in FIG. 4, the method 60 may assume that the higher resolution page image is legible and store the page image at block 88 for display to readers. Alternatively, the higher resolution page image may be subjected to a legibility test, such as the one provided in method 60, to confirm whether the text therein is legible. The method 60 may be repeated for successively higher resolution page images until the legibility criteria set for the page image is met.

It should be recognized that the threshold used in decision block 82 to determine whether a sufficient percentage of text lines in the page image is legible is different than the threshold used in decision block 72 to determine whether the text-to-page height ratio of a given line reflects legible text. For example, in reference to FIG. 5, if the first four lines of the page image 32 are determined legible but none of the remaining 16 lines are legible, the page image 32 may be determined as a whole not legible. At a higher resolution, all the text lines in the page image 32 may be determined legible, except for the last line (footnote). In that circumstance, the percentage of text lines determined to be legible (for which "YES" counts are recorded) may exceed the threshold percentage, and the page image as a whole is determined to be legible. A threshold of 100% for decision block 82 would require that all of the text lines evaluated in a page image be determined legible.

Figure 7:
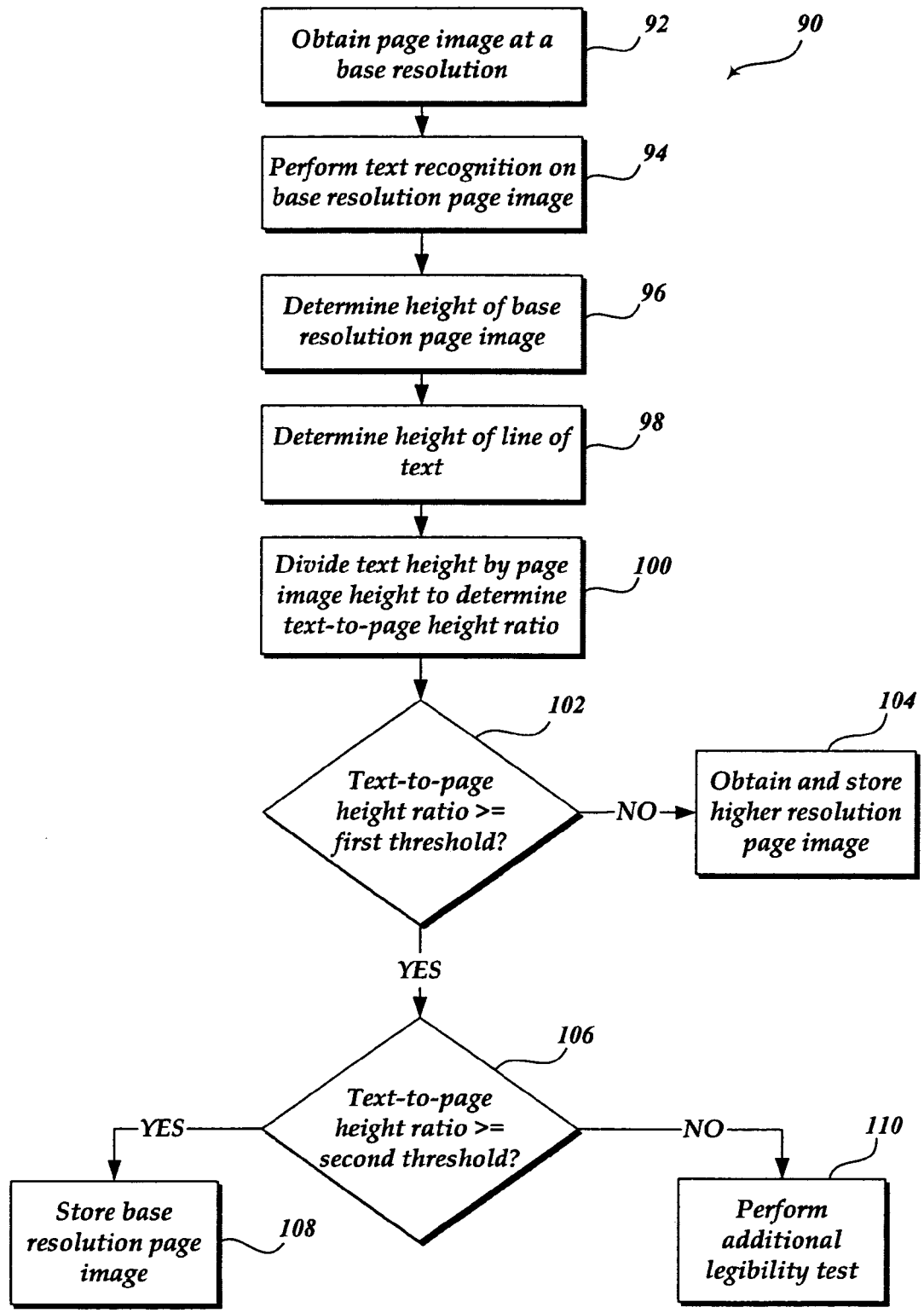
FIG. 7 is a flow diagram of yet another exemplary method for determining the legibility of text in a page image.

Turning now to FIG. 7, another method for determining the legibility of text in a page image in accordance with the invention is provided. The method 90 begins with a set of processes that may be performed in a manner similar to processes described in the method 40 shown in FIG. 4. Specifically, the method 90 begins at block 92 by obtaining an image of a page at a base resolution. Text recognition is performed on the base resolution page image, as indicated at block 94. At block 96, the height of the base resolution page image is determined, and at block 98, the height of a line of text recognized in the page image is determined. At block 100, a text-to-page height ratio for the text line being evaluated is determined by dividing the text height by the page image height.

In contrast to the method 40 (FIG. 4) and method 60 (FIGS. 6A and 6B), the method 90 uses multiple threshold ratios to assess the legibility of text in a page image. Specifically, at decision block 102, the text-to-page height ratio of the text line being evaluated is compared to a first threshold. If the text-to-page height ratio does not exceed the first threshold, the method 90 determines that the line of text, and therefore the page image, is not legible. Similar to the method 40 (FIG. 4), a single line of text is evaluated in the method 90. Alternatively, the method 90 may be implemented on multiple lines of text image using procedures described in the method 60 of FIGS. 6A and 6B. If the line is determined not legible, the method 90 proceeds to obtain a new image of the page at a resolution higher than the base resolution. The method 90 stores the higher resolution page image for display to readers, as indicated at block 104.

If the text-to-page height ratio of the base resolution page image is greater than or equal to the first threshold, the text-to-page height ratio is compared to a second threshold at decision block 106. The second threshold in decision block 106 generally sets a higher standard for legibility than the first threshold in decision block 102. If the text-to-page height ratio satisfies the first threshold (block 102) but does not satisfy the second threshold (block 106), the text of the line being evaluated is determined to be possibly legible. For page images with possibly legible text, the method 90 may subject the page images to one or more additional legibility tests, as indicated at block 110. For example, page images determined to be possibly legible may be subjected to a legibility test as set forth in the method 120 shown in FIG. 9. If the page images are determined legible by the additional legibility test, the page images may then be deemed legible and stored for display to readers. Page images determined not legible or possibly legible by the additional legibility test may be deemed not legible and processed accordingly (e.g., as indicated in block 104). Alternatively, further legibility tests may be employed, if desired.

In circumstances where the text-to-page height ratio satisfies both the first threshold and the second threshold, the text in the base resolution page image is determined to be legible and the page image is stored, as indicated at block 108, for display to readers.

Figure 8:
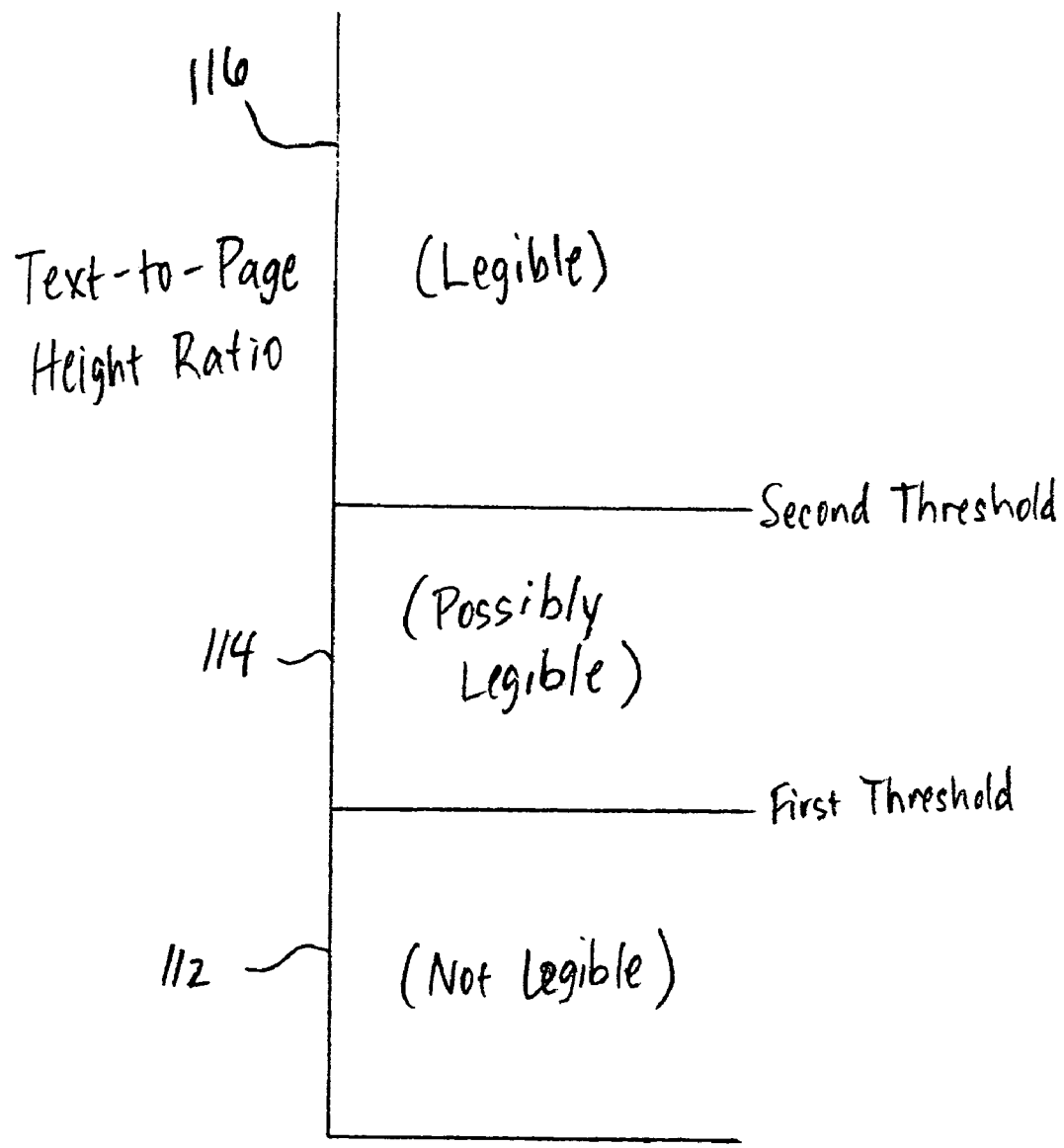
FIG. 8 is an exemplary graph depicting thresholds for determining the legibility of text in a page image using the method shown in FIG. 7.

FIG. 8 is a graph that pictorially describes a legibility determination as used in the method 90 of FIG. 7. In FIG. 8, text having a text-to-page height ratio that does not exceed the first threshold is determined not legible, as shown at reference numeral 112. Text having a text-to-page height ratio exceeding the first threshold but not the second threshold is determined to be possibly legible, as indicated at reference numeral 114. If the text-to-page height ratio of text in the page image equals or exceeds both the first and second thresholds, the text in the page image is determined to be legible, as indicated at reference numeral 116. Using one or more additional legibility tests in subsequent stages of the analysis for "possibly legible" pages is helpful in identifying those page images that are, in fact, legible under at least one legibility test. The goal of certain embodiments o the invention is to obtain and store page images having a resolution not greater than absolutely required for legibility, which helps reduce the overall storage space, and consequently storage costs, for storing page images.

As noted previously, embodiments of the present invention determine the legibility of text in a page image by obtaining and comparing a measure of text in the page image with a measure derived from the page image itself. In the foregoing methods 40, 60, and 90, the measure of text in the page image was a spatial measurement (e.g., height) of a line of text in the page image. The measure derived from the page image itself was the height of the page image in the same spatial dimension as the height of the line of text.

Figure 9:
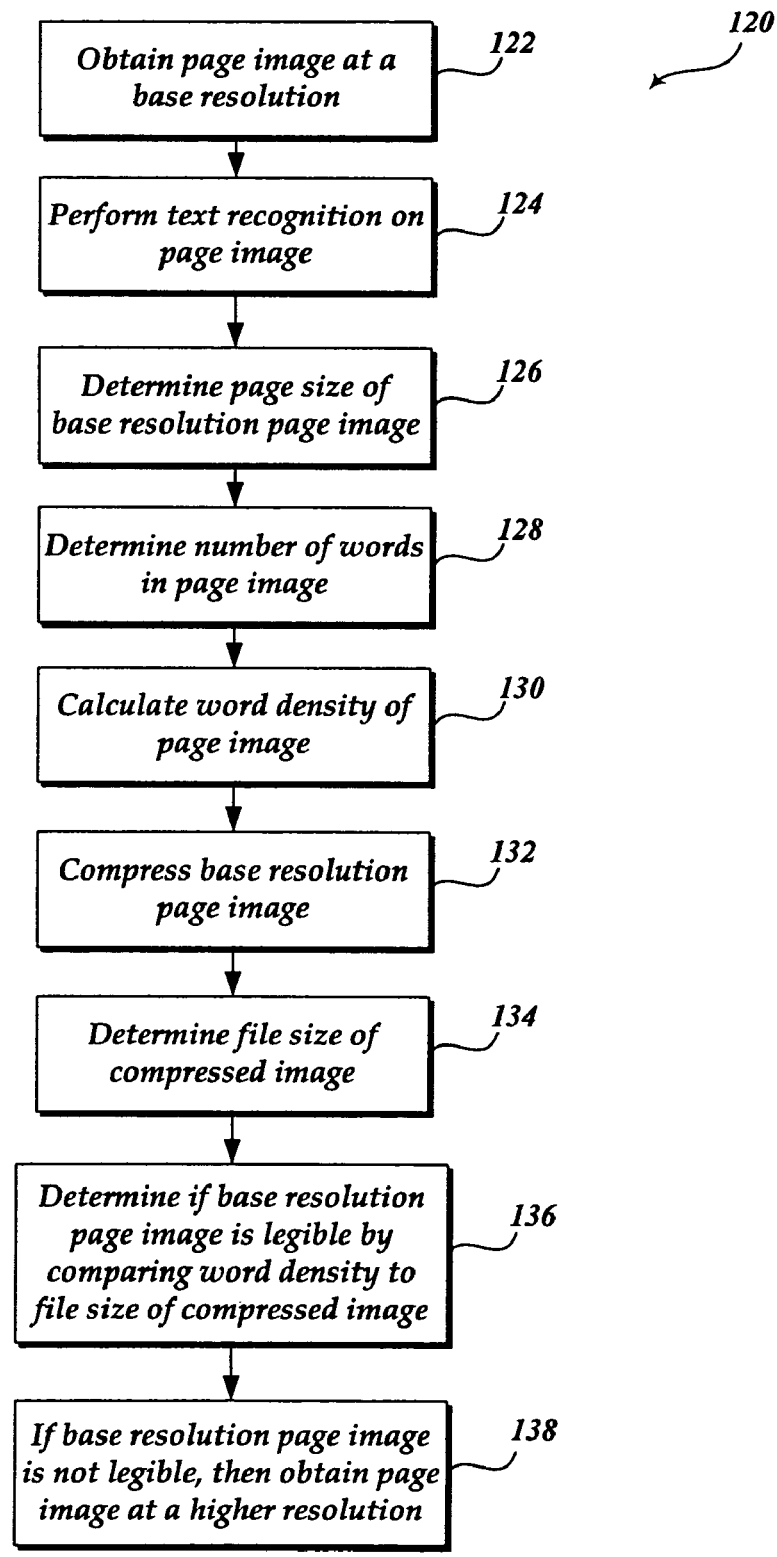
FIG. 9 is a flow diagram of still another exemplary method for determining the legibility of text in a page image according to another embodiment of the present invention.

Described next in FIG. 9 is another embodiment of the present invention in which the legibility of text is determined by comparing a measure of text in the page image with a measure derived from the page image itself. In this embodiment, the measure of text in the page image is a determined density of words in the page image, while the measure derived from the page image itself is a file size of the page image when the page image is compressed by a compression routine.

FIG. 9 illustrates an exemplary method 120 that begins at block 122 by obtaining a page image at a base resolution. At block 124, text recognition is performed on the text in the page image. The processes performed in blocks 122 and 124 may be performed in a manner similar to those processes described in FIGS. 4, 6A, and 7, except preferably all of the text in the page image is recognized in block 124.

At block 126, the method 120 determines the spatial size of the base resolution page image. As will be understood from the description that follows, the size of the page image is used in calculating the density of words in the page image. The size of the page image may be determined from the number of pixels in the horizontal and vertical directions. The page size may also be determined in other units of measure, such as inches or centimeters, in the horizontal and vertical directions.

At block 128, the method 120 determines the number of words in the page image recognized by the text recognition performed in block 124. As with earlier described methods of the invention, the text recognition performed in block 124 does not necessarily require recognizing individual elements of words, nor does it require that the words themselves be recognized (e.g., in terms of spelling or semantic meaning). Text recognition routines that merely identify features of words, such as position and size, may be used to determine the number of words in a page image. At block 130, the density of words in the page image is calculated based on the number of words in the page image and the spatial size of the page image.

At block 132, the method 120 compresses the base resolution page image using a compression algorithm to create a file containing the compressed image. If the base resolution page image has already been compressed as a result of an earlier performed compression process, it may not be necessary for the method 120 to again compress the page image as indicated at block 132. Compression algorithms for use in block 132 are known in the art. For example, compression algorithms that use a cosine transformation or discrete wavelet transformation may be used. Furthermore, the compressed image files may be created in accordance with known formats, such as JPEG, JPEG2000, or Tagged Image File Format, for example.

At block 134, the method 120 derives a measure of the base resolution page image by determining the file size of the compressed page image. The word density of the base resolution page image is then compared to the file size of the compressed image to determine whether the base resolution page image is legible, as indicated at block 136. The basis for determining legibility is discussed below. If, as a result of this comparison, the base resolution page image is determined not legible, the method 120 may optionally take action to obtain a new image of the page at a resolution that is higher than the base resolution, as indicated at block 138. The method 120 may subject the new higher resolution page image to a legibility test, such as the one provided by the method 120, or may assume that the higher resolution page image is legible and store it for display to readers.

The legibility test employed by the method 120 uses a principle of image compression in which the amount of contrast between foreground and background elements in an image is related to the file size of the image when compressed. Typically, an image file with a high amount of contrast between foreground and background elements (e.g., black on white) contains more information and results in a greater file size when compressed. Images having the same spatial size and a low amount of contrast (e.g., gray on light gray) contain less information and result in smaller file sizes when compressed.

The legibility of text in a page image can be highly affected by the contrast between the foreground text and the background of the page image. Text having a higher contrast compared to the background tends to be more legible. Page images having text that blends into the background and has low contrast tends may be more difficult to read at lower resolutions. The method 120 shown in FIG. 9 uses the foregoing principles to evaluate the legibility of text in a page image.

Figure 10:
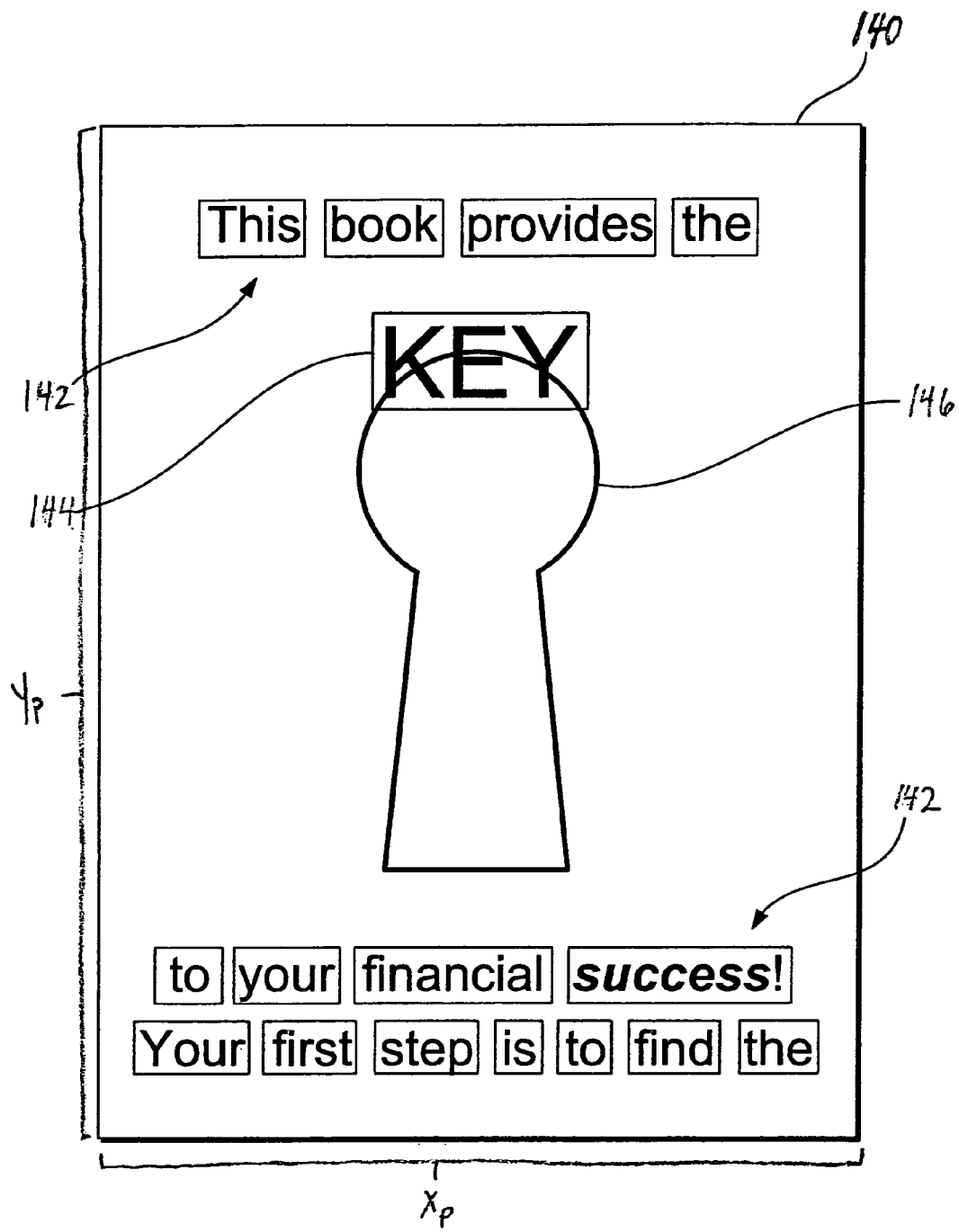
FIG. 10 depicts a page image in which text recognition conducted in accordance with the method shown in FIG. 9 is applied to the page image.

FIG. 10 illustrates a sample page image 140 in which the method 120 is shown to operate. As indicated at reference numerals 142 and 144, text on the page image 140 is recognized (as illustrated by boxes surrounding each of the recognized words). The process of determining the number of words in the page image 140 can be accomplished by counting the number of "boxes" identified by the text recognition. Reference numeral 146 illustrates a graphic element, e.g., as an illustration on the page image 140, that does not represent text in the image, and thus is not part of the word density determination. The width and height of the image 140, referenced by $X_p$ and $Y_p$, is used to determine the page size of the image 140. As noted earlier, the word density of the page image 140 can be determined from the number of words in the page image divided by the spatial size of the page image.

Figure 11:
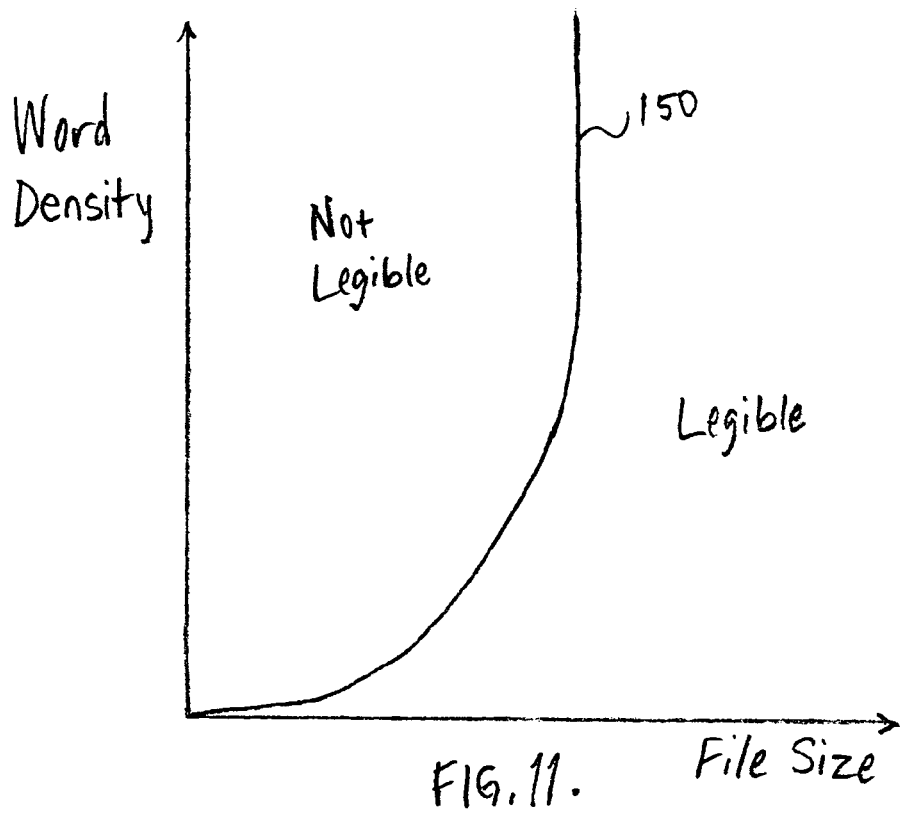
FIGS. 11 and 12 are exemplary graphs depicting thresholds for determining the legibility of text in a page image using the method shown in FIG. 9.
Figure 12:
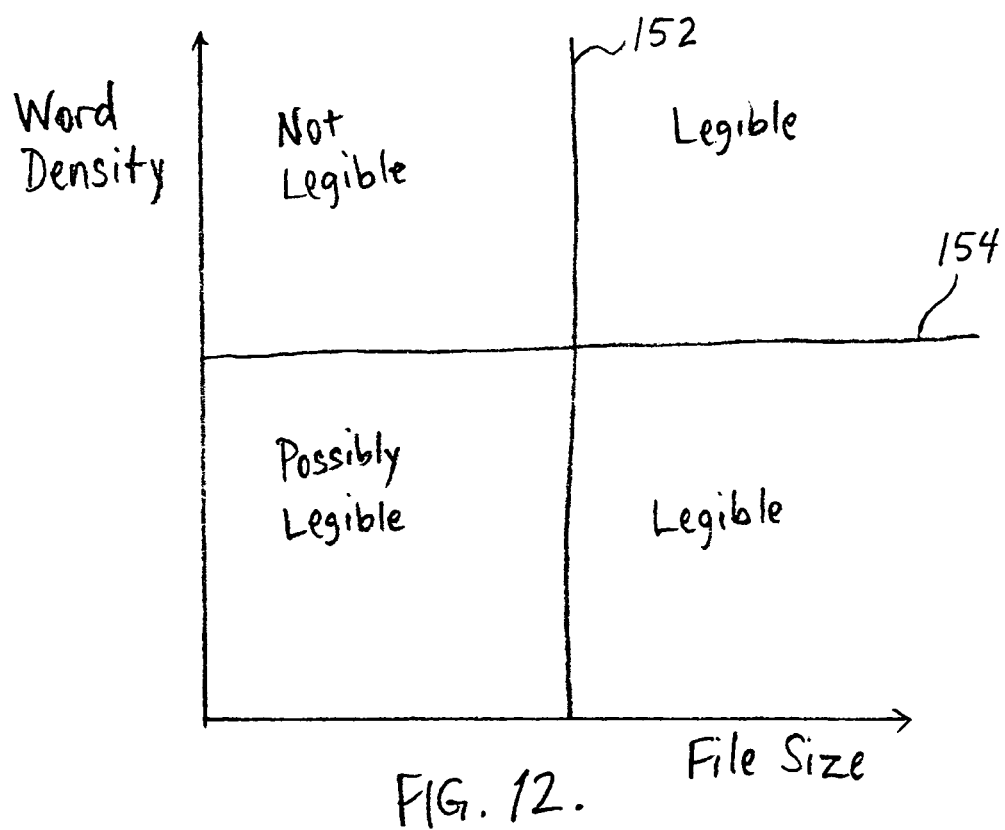

FIGS. 11 and 12 provide sample graphs illustrating the comparison of word density of a page image to the file size of a compressed image file for purposes of determining the legibility of the text in the page image. In FIG. 11, a sample graph is shown with a single threshold line 150 separating page images determined to be not legible from those that are legible. The shape of the threshold line 150 is exemplary only and may be vastly different in actual implementations of the invention, depending on the manner in which word density is calculated and the image compression routine that is used. Regardless, FIG. 11 illustrates the principle that page images having a high word density but small compressed file size probably have low contrast in the page image, and thus are likely not legible (at least at the current resolution of the page image). In circumstances where the file size of the compressed page image is greater, the page image is more likely to contain text with high contrast, and thus is more likely to contain legible text, even where the word density of the page image may be lower.

FIG. 12 illustrates a graph in which multiple threshold lines 152 and 154 are used to determine the legibility of text in a page image. Again, the shape of the threshold lines 152 and 154 may vary in actual implementations of the invention. In this example, page images having a compressed file size exceeding a certain threshold 152 may be determined legible, regardless of the word density in the page image. For page images having a word density exceeding a second threshold 154 but having a compressed file size lower than the first threshold 152, the page images are determined not legible. Page images having a word density lower than the second threshold 154 and a compressed file size lower than the first threshold 152 may be determined possibly legible. As with block 110 of the method 90 shown in FIG. 7, page images determined to be possibly legible may be subject to one or more additional legibility tests, such as a legibility test used in the methods 40, 60, or 90, previously described.

While several embodiments of the invention have been illustrated and described above, it will be appreciated that various changes can be made therein without departing from the spirit and scope of the invention. The scope of the invention should thus be determined from the following clams and equivalents thereto.

The embodiments of the invention in which an exclusive property or privilege is claimed are defined as follows:

1. A computer-implemented method for determining the legibility of text in an image of a page, the method comprising:
    (a) obtaining an image of a page having text therein;
    (b) performing text recognition on text in the page image and producing a measure of the text;
    (c) comparing the measure of the text in the page image with a measure of the page image itself; and
    (d) determining the legibility of the text in the page image based on the comparison of the measure of the text and the measure of the page image.

2. The method of claim 1, wherein performing text recognition comprises identifying a spatial dimension of the text in the page image.

3. The method of claim 2, wherein the measure of the text in the page image is a measure of text height in the identified spatial dimension, and the measure of the page image is a measure of page image height in the same spatial dimension.

4. The method of claim 3, wherein comparing the measure of text height to page image height includes dividing the text height by the page image height to produce a text-to-page height ratio.

5. The method of claim 4, wherein determining the legibility of the text includes comparing the text-to-page height ratio to a threshold.

6. The method of claim 5, wherein the text is determined to be not legible if the text-to-page height ratio does not satisfy the threshold.

7. The method of claim 5, wherein text recognition is performed on text in multiple lines in the page image and each of the multiple lines of text produces a text-to-page height ratio, wherein each of the multiple text-to-page height ratios are compared to the threshold, and the legibility of the text in the page image is determined based on a percentage of the text-to-page height ratios that satisfy the threshold.

8. The method of claim 5, wherein the threshold is a first threshold, the method further comprising comparing the text-to-page height ratio to a second threshold if the text-to-page height ratio satisfies the first threshold.

9. The method of claim 8, wherein the text is determined to be legible if the text-to-page height ratio satisfies the second threshold.

10. The method of claim 8, wherein the text is determined to be possibly legible if the text-to-page height ratio satisfies the first threshold but not the second threshold.

11. The method of claim 8, wherein text recognition is performed on text in multiple lines in the page image and each of the multiple lines of text produces a text-to-page height ratio, wherein if a determined percentage of the multiple text-to-page height ratios satisfy the first threshold, the text-to-page height ratios are compared to the second threshold, and if a determined percentage of the text-to-page height ratios satisfy the second threshold, the text is determined to be legible.

12. The method of claim 1, further comprising storing the page image for display if the text in the page image is determined to be legible.

13. The method of claim 1, wherein if the text in the page image is determined to be not legible, a higher resolution image of the page is obtained.

14. The method of claim 1, wherein performing text recognition includes identifying and counting words that comprise the text in the page image, and wherein producing a measure of the text includes calculating a measure of word density in the page image based on the number of words in the page image and the spatial size of the page image.

15. The method of claim 14, wherein the measure of the page image comprises:
    (a) compressing the page image to form a compressed image file; and
    (b) determining the file size of the compressed image file.

16. The method of claim 15, wherein determining the legibility of the text includes comparing the measure of word density to the file size of the compressed image file.

17. A computer-implemented method for displaying a page image based on a determined legibility of text in the page image, the method comprising:

(a) obtaining an image of a page at a base resolution;

(b) obtaining a measure of the text in the page image;

(c) comparing the measure of the text in the page image with a measure of the page image itself to determine the legibility of text in the page image; and (d) if the text in the page image is determined to be legible, then displaying the page image, otherwise obtaining and displaying a new image of the page obtained at a resolution higher than the base resolution.

18. The method of claim 17, wherein the base resolution page image is obtained from an original high resolution image of the page, and if the text in the base resolution page image is determined to be not legible, then the new page image is obtained from the original high resolution page image at a resolution higher than the base resolution.

19. The method of claim 17, wherein obtaining the measure of text in the page image includes performing text recognition on text in the page image.

20. The method of claim 19, wherein performing text recognition comprises identifying a spatial dimension of the text in the page image, wherein the measure of the text in the page image is a measure of text height in the identified spatial dimension, and wherein the measure of the page image is a measure of page image height in the same identified spatial dimension.

21. The method of claim 20, wherein comparing the measure of text height to page image height includes dividing the text height by the page image height to produce a text-to-page height ratio, and wherein determining the legibility of the text includes comparing the text-to-page height ratio to a threshold.

22. The method of claim 19, wherein text recognition is performed on multiple lines of text in the page image.

23. The method of claim 19, wherein performing text recognition includes identifying and counting words that comprise the text in the page image, wherein producing the measure of the text includes calculating a measure of word density in the page image based on the number of words in the page image and the spatial size of the page image, wherein the measure of the page image includes compressing the page image to form a compressed image file and determining the file size of the compressed image file, and wherein determining the legibility of the text includes comparing the measure of word density to the file size of the compressed image file.

24. A multistage method for automated determination of legibility of text in an image of a page, comprising:

(a) obtaining an image of a page having text therein;

(b) determining the legibility of the text by applying a first test of legibility to the text in the page image, wherein the first test of legibility includes obtaining a measure of the text in the page image and comparing the measure of the text with a measure of the page image itself;

(c) determining the legibility of the text by applying a second test of legibility to the text in the page image; and (d) storing the page image for display if the text in the page image is determined to be legible.

25. The method of claim 24, wherein the page image is stored for display if the text in the page image is determined to be legible by either the first test or the second test.

26. The method of claim 24, wherein the page image is stored for display if the text in the page image is determined to be legible based on the results of both the first test and the second test.

27. The method of claim 24, wherein if the text in the page image is determined not legible based on the first test, the second test is not applied to the page image.

28. The method of claim 24, wherein the result of the first test is one of legible, not legible, or possibly legible, and wherein the second test is applied if the result of the first test is possibly legible.

29. A computer-implemented system configured to determine the legibility of text in an image of a page, comprising a processor and a computer-readable medium containing computer-executable instructions that, when executed by the processor, cause the system to obtain an image of a page having text therein, perform text recognition on the text in the page image and produce therefrom a measure of the text, compare the measure of the text in the page image with a measure of the page image itself, and determine the legibility of the text in the page image based on the comparison of the measure of the text and the measure of the page image.

30. The system of claim 29, wherein the computer-executable instructions, when executed by the processor, further cause the system to measure the text in the page image by measuring a height of a line of text, and further measure the height of the page image to derive the measure of the page image.

31. The system of claim 30, wherein the computer-executable instructions, when executed by the processor, further cause the system to determine the legibility of the text by comparing the measure of text height with the page image height.

32. The system of claim 29, further comprising a memory in communication with the processor for storing the page image for display if the text in the page image is determined to be legible.

33. The system of claim 29, wherein if the text in the page image is determined to be not legible, the computer-executable instructions, when executed by the processor, further cause the system to obtain a higher resolution image of the page.

34. The system of claim 29, wherein the computer-executable instructions, when executed by the processor, further cause the system to identify and count words that comprise the text in the page image and produce a measure of the text by calculating a word density based on the number of words in the page image and a spatial size of the page image.

35. The system of claim 34, wherein the computer-executable instructions, when executed by the processor, further cause the system to determine the legibility of the text by compressing the page image to form a compressed image file, determine the file size of the compressed image file, and compare the calculated word density with the file size of the compressed image file.

36. The system of claim 29, further comprising a display in communication with the processor for displaying the page image based on a determined legibility of the text in the page image.

37. The system of claim 36, wherein if the text in the page image is determined to be not legible, the computer-executable instructions, when executed by the processor, further cause the system to obtain and communicate to the display a higher resolution image of the page.

38. The system of claim 29, further comprising a memory in communication with the processor, wherein the computer-executable instructions, when executed by the processor, further cause the system to determine the legibility of the text by applying a first test of legibility and a second test of legibility to the text in the page image, and store the page image in the memory for display if the text in the page image is determined to be legible.

39. The system of claim 38, wherein the computer-executable instructions, when executed by the processor, further cause the system to store the page image for display if the text in the page image is determined to be legible by either the first or the second test of legibility.

40. The system of claim 38, wherein the computer-executable instructions, when executed by the processor, further cause the system to store the page image for display if the text in the page image is determined to be legible based on the results of both the first and second tests of legibility.

41. The system of claim 38, wherein if the processor determines the text in the page image is not legible based on the first test of legibility, the computer-executable instructions, when executed by the processor, further cause the system to not apply the second test of legibility to the page image.

* * * * *